Figure 1:
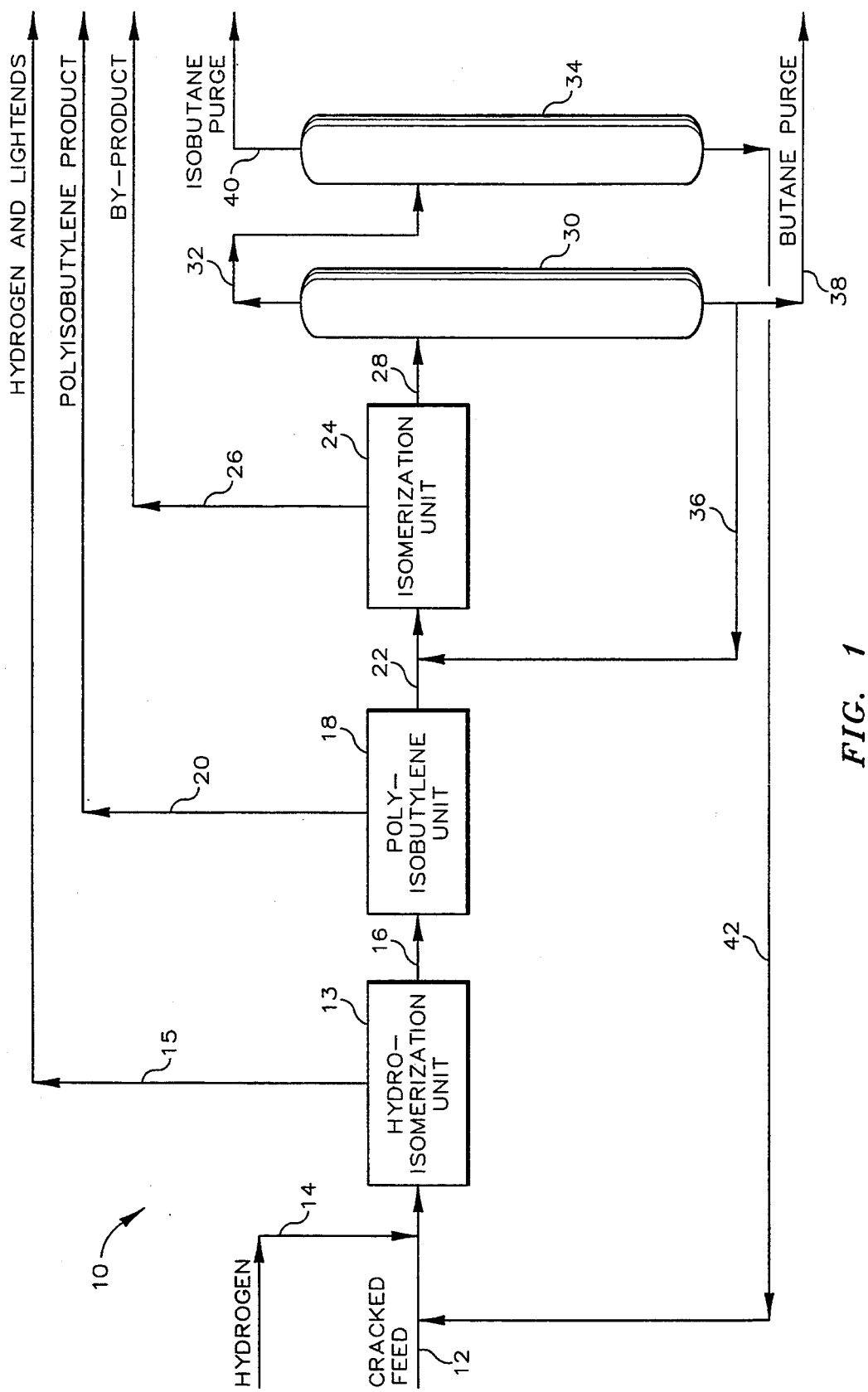

United States Patent [19]
Hunt et al.

[11] Patent Number: 5,414,179
[45] Date of Patent: May 9, 1995

[54] METHOD FOR CONTROLLING THE FEED COMPOSITION TO A PROCESS FOR POLYMERIZING ISOBUTYLENE

[75] Inventors: Harold R. Hunt, Bartlesville, Okla.; Stephen P. Thomas, Houston, Tex.

[73] Assignee: Phillips Petroleum Company, Bartlesville, Okla.

[21] Appl. No.: 235,773

[22] Filed: Apr. 29, 1994

[51] Int. Cl.⁶ .............................................. C07C 2/02
[52] U.S. Cl. .................................. 585/519; 585/314; 585/324; 585/326
[58] Field of Search ............... 585/314, 315, 316, 324, 585/326, 925, 329, 519

[56] References Cited
U.S. PATENT DOCUMENTS

| | | | |
|---|---|---|---|
| 2,637,720 | 5/1953 | Schneider et al. | 260/82 |
| 4,691,072 | 9/1987 | Schick et al. | 585/525 |

*Primary Examiner*—Asok Pal
*Assistant Examiner*—Bekir L. Yildirim
*Attorney, Agent, or Firm*—Charles W. Stewart

[57] ABSTRACT

A process for processing a cracked feed stream so as to provide a feed stream, having a requisite concentration of isobutylene and butene-1, to a polymerization unit for polymerization of isobutylene.

4 Claims, 1 Drawing Sheet

METHOD FOR CONTROLLING THE FEED COMPOSITION TO A PROCESS FOR POLYMERIZING ISOBUTYLENE

The present invention relates to a method for controlling the composition of a feed stream to a process for producing polymers of isobutylene.

In order to produce polymers of isobutylene having certain desired physical characteristics, the feed to a polymerization system must contain appropriate concentrations of monomer. Particularly, it has been determined that the concentration of isobutylene in the polymerization system feed must be at least about 20 volume percent of the total volume of feed. It has further been determined that an excessively high concentration of butene-1 as represented by the volumetric ratio of butene-1 to isobutylene in the polymerization system feed is undesirable and should not exceed about 0.3:1; otherwise, an undesirable polyisobutylene product will be produced by the polymerization process.

It is desirable to use a cracked feedstock as a feed to an isobutylene polymerization process; but, due to the concentrations of the light olefins, such cracked feedstocks cannot, without further processing, be processed as a polymerization feed.

Thus, one object of the invention is to provide a method of processing a cracked feedstock so as to provide a feedstock suitable as a feed to a polymerization system for polymerizing isobutylene.

Another object of the invention is to provide a method for controlling the composition of a feed stream to a polymerization system for polymerizing isobutylene.

Therefore, the inventive process provides for controlling the composition of a feed stream to a polymerization unit. A cracked feed is passed to a hydroisomerization unit which produces a hydroisomerate stream. The hydroisomerate stream is utilized as a feed stream to the polymerization unit for producing polyisobutylene and an effluent stream. The effluent stream is passed to an isomerization unit which produces an isomerate stream. The isomerate stream is passed to first separation means for separating isobutylene and butene-2 and for providing a first overhead stream comprising isobutylene and a first bottoms stream comprising butene-2. At least a portion of the first bottoms stream is introduced into the effluent stream of the polymerization unit, and the first overhead stream is passed to second separation means for separating isobutane and isobutylene and for providing a second overhead stream comprising isobutane and a second bottoms stream comprising isobutylene. At least a portion of the second bottoms stream is introduced into the cracked feed used as a feed to the hydroisomerization unit.

In the accompanying drawing,

FIG. 1 provides a schematic representation of the inventive process.

Other objects and advantages of the invention will be apparent from the foregoing detailed description of the invention and the appended claims.

The inventive process utilizes a novel arrangement of subprocesses and separation means to provide a feed stream, having a desired composition of linear and non-linear olefin compounds, to a polymerization unit for polymerizing isobutylene to form a polyisobutylene product. Thus, in accordance with the present invention, an olefin feed stream is passed or charged to a hydroisomerization process system or unit whereby a hydroisomerate stream is produced and which can be used as a feed stream to a polymerization unit.

The olefin feed stream can contain olefin compounds. Generally, the olefin feed stream includes olefin compounds having 3 to 5 carbon atoms, preferably, those olefin compounds having 4 carbon atoms. thus, the olefin feed stream can comprise butenes which can include butene-1, butene-2, and isobutylene. Depending upon its source, the olefin feed stream can contain diolefin compounds which include primarily butadiene.

Ultimately, the olefin feed stream will originate from a cracked feed stream. The cracked feed stream can be from any source which suitably provides for a stream containing a mixture of paraffins and olefins or a mixture of olefins. It is preferred for the cracked feed to comprise or consist essentially of such olefins or paraffins having four carbon atoms per molecule and further containing a concentration of isobutylene. Suitable sources of a cracked feed include the C4 fraction of the product from a fluidized catalytic cracking unit for cracking a gas oil petroleum fraction and the product from a thermal cracking unit, or steam cracker, for cracking light hydrocarbons and a naphtha boiling range petroleum fraction. Such cracked feedstocks should be as free of compounds having fewer than or more than four carbon atoms as possible; therefore, the cracked feedstock may require preliminary processing to remove such light ends and heavy ends. Thus, the cracked feed stream will comprise hydrocarbons having four carbon atoms and, preferably, comprise butene-1, butene-2, isobutylene and butanes, either n-butane or isobutane, or both. The most preferred component of the cracked feed is isobutylene.

While the composition of the cracked feed stream will generally vary depending upon its source and the preliminary processing to remove the aforementioned light ends, heavy ends and a major portion of any diolefins present, Table I below is provided to give the general concentration ranges for the most important compounds of the cracked feed.

TABLE I

General Concentration Ranges for Key Components of a Cracked Feed in Terms of Volume Percent

| | Volume % |
|---|---|
| isobutane | 1–40 |
| n-butane | 1–15 |
| isobutylene | greater than 5 |
| butene-1 | less than about 50 |
| butene-2 | less than about 50 |
| diolefin | up to about 2 |

It is most desirable for the feed to a polyisobutylene process unit to have as high a concentration of isobutylene as is possible in order to produce a polyisobutylene product having suitable physical properties. It is also important in the production of a desirable polyisobutylene product for the feed to the polyisobutylene polymerization process unit to have a low butene-1 concentration relative to the isobutylene feed concentration. It is, moreover, important to the operation of a polyisobutylene polymerization process and to the production of a desirable polyisobutylene end-product for the polyisobutylene process unit feedstock to be as free of diolefin contaminants as possible.

Often, the concentrations of the major components of a cracked feed will not be within the ranges required for such a cracked feed to be one suitable as a feed to a polyisobutylene process unit and, thus, the cracked feed must be processed in a manner as to provide a feed stream that is acceptable for a polyisobutylene process unit.

It is a critical aspect of this invention for the feed to the polyisobutylene process unit to, generally, have a concentration of isobutylene of at least about 20 volume percent, preferably at least about 25 volume percent and, most preferably, at least 30 volume percent. Additionally, the molar ratio of butene-1 to isobutylene in the polyisobutylene process feed generally should be less than about 0.30:1, preferably less than about 0.25:1 and, most preferably, less than 0.20:1. It is also important for the polyisobutylene process feed to have a concentration of diolefins as low as possible, which is generally less than about 100 ppm, preferably less than about 50 ppm and, most preferably, less than 10 ppm.

Therefore, the inventive process provides for the processing of a cracked feed, which in itself does not have the required concentrations of components for it to be a suitable polyisobutylene process feed, in order to provide a feed stream to a polyisobutylene process unit having the requisite properties and feed component concentrations. The cracked feed stream is passed to a hydroisomerization unit, whereby diolefins in the cracked feed are selectively hydrogenated to form olefins, and butene-1 is isomerized to butene-2, to produce an hydroisomerate stream.

The catalysts utilized in the hydroisomerization unit of this invention comprise the noble metals of Group VIII of the Periodic Table of Elements, as listed in the *Handbook of Chemistry and Physics*, published by the Chemical Rubber Company, in the 49th Edition (1969), page B-3. The catalysts intended to be included in the group of noble metals of Group VIII specifically are ruthenium, rhodium, palladium, osmium, iridium, and platinum.

Any of the usual catalyst supports can be employed, such as alumina (preferred), silica alumina, glass beads, and carbon. Catalysts in the form of pellets, spheres, and extrudates are satisfactory.

A preferred hydroisomerization catalyst is palladium on a carrier, the carrier preferably being alumina. The catalyst should contain from about 0.005 to about 2.0 percent palladium on alumina, preferably about 0.1 to about 1.0 weight percent palladium on alumina. Most preferably, the catalyst should contain from about 0.3 to about 0.5 weight percent palladium on alumina. A suitable catalyst weights about 40 to about 60 pounds per cubic foot, has a surface area of about 30 to about 150 square meters per gram, a pore volume of about 0.35 to about 0.50 mL per gram, and a pore diameter of about 200 to about 500 Å.

As an example, a suitable commercial hydroisomerization catalyst satisfactory for use in this invention is manufactured by Mallinckrodt Specialty Chemicals Company, designated as Calsicat catalyst number E-144 SDU. The commercial catalyst contains about 0.55 weight percent palladium on alumina.

The hydroisomerization process is conducted at a reaction temperature of about 100° to about 300° F., preferably 130°–200° F.

The hydroisomerization process of this invention can be most effectively practiced at relatively low pressure conditions while maintaining the hydrocarbon most preferably in the liquid phase, although vapor phase operation can be used. Pressures employed for the liquid phase process are from about 100 to about 600 psig, preferably from about 150 to about 300 psig. Liquid hourly space velocities, LHSV, are maintained from about 2 to about 50, preferably from about 3 to about 10.

Hydrogen is utilized in the hydroisomerization process by preferably being mixed with the hydrocarbon feed stream prior to contacting the stream with the hydroisomerization catalyst. The hydrogen is necessary to effect double bond isomerization of the 1-olefin with the hydroisomerization catalysts and to provide for hydrogenation of diolefins to olefins. The hydrogen is added in amounts from 0.1 to 20.0 mol percent, preferably in amounts of about 1.0 to about 10.0 mol percent.

The hydroisomerate stream is charged or passed to the polyisobutylene polymerization process unit, or polymerization unit, where it is subjected to polymerization at a polymerization temperature generally in the range of from 50° F. to 325° F.

The catalyst utilized in the polymerization process unit of this invention can include any material that suitably induces the polymerization of isobutylene to form polyisobutylene. Such catalyst materials can include for example, acidic substances, Ziegler-Natta catalysts, and various other initiators.

Many Bronsted acids can initiate the polymerization reaction and include, for example, sulfuric acid, phosphoric acid, dihydroxy fluoroboric acid, and molybdic acid. While such Bronsted acids may induce polymerization, they generally are not preferred because the low molecular weight polymers produced. However, preferred polymerization catalysts include active halide catalysts such as Lewis acids including $BF_3$, $AlCl_3$, $AlBr_3$, $TiCl_4$, $SnC_4$ and the like and related electron acceptors such as trialkylaluminums and alkylaluminum halides. Such Lewis acid polymerization catalysts are preferred due to their ability to produce higher molecular weight polyisobutylenes. Certain solid materials that have acidic surfaces can also induce the polymerization of isobutylene and include natural clays, synthetic zeolites, silica-alumina, active carbon, and the reaction product of phosphoric acid with kieselguhr.

The polymer product, or polyisobutylene product, produced by the polymerization unit is separated from the polymerization reaction effluent with the remaining non-reactive hydrocarbons passing from the polymerization unit as an effluent stream for further downstream processing. The isobutylene component of the polymerization unit feed stream is the principal reactive component, thus, the effluent from the isomerization unit will principally contain the non-reactive paraffins, such as isobutane and n-butane, and the lesser reactive or even non-reactive, linear olefins such as butene-1 and butene-2. Therefore, the effluent stream from the polymerization unit will generally contain butanes and linear butylenes; but, more specifically, the effluent stream contains isobutane, n-butane, butene-1 and butene-2.

The effluent stream from the polymerization unit is charged or passed to an isomerization process unit for isomerizing at least a portion of the butene-2 of the effluent stream to isobutylene and to produce an isomerate stream, which contains the isobutylene formed by way of the isomerization reaction and non-reactive paraffins and lesser reactive or even non-reactive butene-1.

The isomerization process step utilizes a equilibrium type reaction in which butene-2 is isomerized to isobutylene; therefore, for the highest conversion to isobutylene, it is important for the charge to the isomerization unit to be as free of an isobutylene concentration as possible. This is achieved by utilizing as its charge the effluent stream from the isobutylene polymerization unit, which is depleted of isobutylene.

The olefin isomerization process step includes charging or passing the effluent stream from the polymerization unit along with an added water or steam diluent present in an amount of at least about 0.1 mole of water or steam per mole of olefin.

The acidic alumina catalysts utilized in the isomerization process unit are those known in the art. Preferably, the alumina should have a surface area of at least 50 $m^2/g$. In the practice of the present invention, the alumina is used without the incorporation of substantial amounts of inert solids and does not contain substantial amounts of impurities. Good results are obtained with aluminas having a purity of at least about 99.50 weight percent. The alumina can be in any desired form suitable for contact with the olefin including the example granules, spheres, microspheres, pellets, tablets, fluid powder, etc. Preferably alumina catalysts include catalytic beta-alumina and gamma-alumina.

The catalyst can be employed in any manner conventional within the art, such as in a fixed bed, a fluidized bed and the like.

The conversion process can be carried out either batch-wise or continuously, using a fixed catalyst bed, stirred batch reactor, a fluidized catalyst chamber, or other suitable contacting techniques. The process conditions should be suitable to carry out the conversion of the particular olefin involved.

In general, the process can be carried out at a temperature from 600° to 1200° F., preferably from about 850° F. to about 1000° F. Any convenient pressure can be used, with the lowest practical pressure preferred in order to minimize side reactions such as polymerization. Pressures ranging from atmospheric to 200 psig are particularly suitable.

The LHSV is generally in the range of about 0.1 to 30 volume liquid olefin/volume of catalyst/hr., preferably about 0.2–20.

The isomerate product from the isomerization unit, which is rich in isobutylene, is passed to first separation means for separating isobutylene and butene-2 and/or normal butane. The first separation means can be any apparatus that suitably provides for the requisite separation. It is preferred for the first separation means to be a conventional fractionator column which gives a first overhead stream comprising isobutylene and a first bottoms stream comprising butene-2. The first overhead stream can further contain the compounds of isobutane and butene-1, and the first bottom stream can further contain the compound of n-butane.

The function of the first separation means is to separate the isobutane, isobutylene and butene-1 from the butene-2 of the isomerate stream so that a portion of the butene-2 is returned or recycled to the isomerization unit. Thus, at least a portion of the first bottoms stream is introduced into the effluent stream of the polymerization unit and charged to the isomerization unit. The portion of the first bottoms stream not introduced into the polymerization unit effluent stream is passed from first separation means as a purge stream which serves to purge or remove normal butane from the process system. For the overall process, the recycling of the linear butenes for use as a feed to the isomerization unit serves to ultimately reduce the linear butenes in the hydroisomerization unit feed. Thus, the first bottoms stream generally can contain butene-2 and, more specifically, it can contain butene-2 and n-butane.

The first overhead stream is passed to second separation means for separating isobutane and isobutylene. Any suitable apparatus may be used as second separation means, but it is preferred to use a conventional fractionation apparatus to provide a second overhead stream containing isobutane and a second bottoms stream containing isobutylene. The second overhead stream passes from second separation means as a purge stream for purging isobutane from the process system. At least a portion of the second bottoms stream, however, can be returned or recycled to the hydroisomerization unit. Thus, at least a portion of the second bottoms stream is introduced into the cracked feed and charged to the hydroisomerization unit.

It is apparent from a study of the overall process that the specific combination and arrangement of process steps is critical to the provision of a feed stream to the polymerization unit having the necessary composition as described earlier herein. In order to better control the polymerization unit feed composition, at least a portion of said first bottoms stream can be controlled to provide the desired volumetric ratio of butene-1 to isobutylene in the polymerization unit feed stream. Also, at least a portion of said second bottoms stream can be controlled to provide the desired concentration of isobutylene in the feed to the polymerization unit.

Now referring to FIG. 1, there is provided a schematic representation of process system 10 of this invention. A cracked feed stream is introduced by way of line 12 into hydroisomerization unit or process system 13 whereby the cracked feed stream is processed to form a hydroisomerate stream and a light ends stream comprising unreacted hydrogen and light hydrocarbons. Hydrogen is added to the cracked feed by way of conduit 14 prior to introducing the resulting mixture to hydroisomerization unit 13. The light ends stream passes from hydroisomerization unit 13 by way of conduit 15.

The hydroisomerate stream passes from hydroisomerization unit 13 by way of line 16 and is charged or fed to polyisobutylene process system or polymerization unit 18 whereby the isobutylene of the hydroisomerate stream is polymerized to form a polyisobutylene polymer product. Passing from polymerization unit 18 through line 20 is the polyisobutylene end-product, and through line 22 the effluent from polyisobutylene unit 18 passes and is charged or fed to isomerization unit or process system 24 whereby the effluent stream is processed to form a by-product stream and an isomerate stream. The by-product stream passes from isomerization unit 24 through line 26 and the isomerate stream passes through line 28 to first fractionator 30.

First fractionator 30 provides for the separation of the isomerate stream into a first overhead stream, comprising isobutylene, and a first bottom stream, comprising butene-2. The first overhead stream passes from first fractionator 30 by way of line 32 to second fractionator 34. As for the first bottom stream, a portion of such stream is passed as a recycle stream to isomerization unit 24 through line 36 and a remaining portion of the first bottom stream is passed from first fractionator 30 through line 38 as a purge stream for purging n-butane from process system 10. Second fractionator 34 provides for the separation of the first overhead stream into a second overhead stream, comprising isobutane, and a second bottom stream, comprising isobutylene. The second overhead stream passes from second fractionator 34 through line 40 to purge process system 10 of isobutane and the second bottom stream is recycled to hydroisomerization unit 14 through line 42.

CALCULATED EXAMPLE

To illustrate the inventive process shown in FIG. 1, this calculated example is provided. The material balance for the calculated example is provided in Table I. The stream numbers shown in Table I correspond to those represented in FIG. 1. The material balance provided in Table I assumes a simplified isomerization reactor where the by-product reaction is a disproportionation reaction.

TABLE I

Calculated Material Balance

| mass fraction | Stream | | | | | | |
|---|---|---|---|---|---|---|---|
| | 12 | 14 | 15 | 16 | 20 | 22 | 26 |
| Hydrogen | 0.0000 | 1.0000 | 0.0096 | 0.0000 | 0.0000 | 0.0000 | 0.0000 |
| Propene | 0.0000 | 0.0000 | 0.0000 | 0.0000 | 0.0000 | 0.0000 | 0.0000 |
| i-Butene | 0.2401 | 0.0000 | 0.3310 | 0.3342 | 0.0000 | 0.0245 | 0.0367 |
| 1-Butene | 0.5324 | 0.0000 | 0.0529 | 0.0534 | 0.0000 | 0.0783 | 0.0000 |
| 2-Butenes | 0.0600 | 0.0000 | 0.4234 | 0.4274 | 0.0000 | 0.6264 | 0.0000 |
| i-Butane | 0.0450 | 0.0000 | 0.0637 | 0.0644 | 0.0000 | 0.0943 | 0.0305 |
| n-Butane | 0.1215 | 0.0000 | 0.1193 | 0.1205 | 0.0000 | 0.1766 | 0.3214 |
| Butadiene | 0.0010 | 0.0000 | 0.0000 | 0.0000 | 0.0000 | 0.0000 | 0.0000 |
| Pentane | 0.0000 | 0.0000 | 0.0000 | 0.0000 | 0.0000 | 0.0000 | 0.3821 |
| Polyisobutylene | 0.0000 | 0.0000 | 0.0000 | 0.0000 | 1.0000 | 0.0000 | 0.0000 |
| Mass Flow, lb/hr | 27,557.50 | 3.15 | 52.29 | 51,740.38 | 16,428.33 | 35,312.05 | 5,481.50 |

| mass fraction | Stream | | | | | |
|---|---|---|---|---|---|---|
| | 28 | 32 | 36 | 38 | 40 | 42 |
| Hydrogen | 0.0000 | 0.0000 | 0.0000 | 0.0000 | 0.0000 | 0.0000 |
| Propene | 0.0000 | 0.0000 | 0.0000 | 0.0000 | 0.0000 | 0.0000 |
| i-Butene | 0.1630 | 0.4406 | 0.0244 | 0.0244 | 0.4342 | 0.4413 |
| 1-Butene | 0.1138 | 0.2828 | 0.0294 | 0.0294 | 0.1717 | 0.2953 |
| 2-Butenes | 0.2705 | 0.0537 | 0.3787 | 0.3787 | 0.0013 | 0.0596 |
| i-Butane | 0.0393 | 0.1172 | 0.0004 | 0.0004 | 0.3905 | 0.0863 |
| n-Butane | 0.4134 | 0.1057 | 0.5671 | 0.5671 | 0.0023 | 0.1773 |
| Butadiene | 0.0000 | 0.0000 | 0.0000 | 0.0000 | 0.0000 | 0.0000 |
| Pentane | 0.0000 | 0.0000 | 0.0000 | 0.0000 | 0.0000 | 0.0000 |
| Polyisobutylene | 0.0000 | 0.0000 | 0.0000 | 0.0000 | 0.0000 | 0.0000 |
| Mass Flow, lb/hr | 80,978.26 | 26,968.86 | 51,147.71 | 2,861.72 | 2,736.84 | 24,232.02 |

Reasonable variations and modifications are possible within the scope of the foregoing disclosure, drawings and appended claims.

That which is claimed is:

1. A process for controlling the composition of a feed stream, containing butane and olefins having at least four carbon atoms per molecule, to a polymerization unit, said process comprising the steps of:
passing an olefin feed stream to a hydroisomerization unit whereby diolefins are selectively hydrogenated and butene-1 is isomerized to butene-2 to thereby produce a hydroisomerate stream;
passing said hydroisomerate stream as said feed stream to said polymerization unit to thereby produce a polymerization reaction effluent which is separated into a polyisobutylene product stream and an effluent stream containing butanes and linear butenes;
passing said effluent stream to an isomerization unit for isomerizing at least a portion of the butene-2 of said effluent stream to isobutylene to thereby produce an isomerate stream;
passing said isomerate stream to first separation means for separating isobutylene and butene-2 and for producing a first overhead stream comprising isobutylene and a first bottoms stream comprising butene-2;
introducing at least a portion of said first bottoms stream into said effluent stream;
passing said first overhead stream to second separation means separating isobutane and isobutylene and for producing a second overhead stream comprising isobutane and a second bottoms stream comprising isobutylene; and
introducing at least a portion of said bottoms stream into said olefin feed stream.

2. A process as recited in claim 1, wherein the amount of said at least a portion of said first bottoms stream introduced into said effluent stream is such as to provide a desired volumetric ratio of butene-1 to isobutylene in said feed stream that is less than about 0.30:1.

3. A process as recited in claim 2, wherein the amount of said at least a portion of said second bottoms stream introduced into said olefin feed stream is such as to provide a desired concentration of isobutylene in said feed stream that is at least about 20 volume percent of the total volume of said feed stream.

4. A process as recited in claim 1,
wherein the amount of said at least a portion of said second bottoms stream introduced into said olefin feed stream is such as to provide a desired concentration of isobutylene in said feed stream that is at least about 20 volume percent of the total volume of said feed stream.

* * * * *

UNITED STATES PATENT AND TRADEMARK OFFICE
CERTIFICATE OF CORRECTION

PATENT NO.   : 5,414,179

DATED        : May 9, 1995

INVENTOR(S)  : Harold R. Hunt et al.

It is certified that error appears in the above-identified patent and that said Letters Patent is hereby corrected as shown below:

Column 8, line 11, after "means" insert --- for ---.

Signed and Sealed this

Eighth Day of August, 1995

Attest:

BRUCE LEHMAN

*Attesting Officer*     *Commissioner of Patents and Trademarks*